United States Patent [19]
Kleinfeld et al.

[11] 3,787,259

[45] Jan. 22, 1974

[54] VINYL CHLORIDE RESIN BACKED FLOOR COVERING

[75] Inventors: Martin J. Kleinfeld, Woodbridge; Alfred J. Heinrichs, Hamden, both of Conn.

[73] Assignee: Uniroyal Inc., New York, N.Y.

[22] Filed: Nov. 10, 1971

[21] Appl. No.: 197,303

Related U.S. Application Data

[63] Continuation-in-part of Ser. No. 73,452, Sept. 18, 1970, abandoned.

[52] U.S. Cl..................... 156/78, 156/283, 161/67, 161/159, 161/160
[51] Int. Cl..................... B32b 5/20, B32b 31/26
[58] Field of Search.... 156/283, 72, 78; 161/67, 83, 161/87, 159, 160; 264/112, 113, 122, 123, 126

[56] References Cited
UNITED STATES PATENTS

| 3,067,469 | 12/1962 | Yarrison | 264/112 |
| 3,192,294 | 6/1965 | Streed et al. | 264/126 |
| 3,332,828 | 7/1967 | Faria et al. | 161/67 |
| 3,585,099 | 6/1971 | Van Buskirk | 161/67 |
| 3,695,987 | 10/1972 | Wisotzky et al. | 161/67 |

FOREIGN PATENTS OR APPLICATIONS

971,958   10/1964   Great Britain ........................ 161/67

*Primary Examiner*—William J. Van Balen
*Attorney, Agent, or Firm*—James J. Long

[57] ABSTRACT

Floor covering is backed by applying to the back of the floor covering dry, solid fragments of prefluxed plasticized vinyl chloride resin compound, in the form of granules or dice, for example. Heat is applied to melt the prefluxed vinyl granules or the like in situ on the back of the floor covering to form a continuous backing sheet which is firmly adhered to the floor covering. The backing thus formed can serve to lock the tufts in place in a tufted carpet. The prefluxed granules or fragments can contain a chemical blowing agent which decomposes during the heating, producing a resilient vinyl foam backing. Since the vinyl granules can be of various colors, a tweed or multi-colored backing can be produced.

6 Claims, 15 Drawing Figures

PATENTED JAN 22 1974　　3,787,259

VINYL CHLORIDE RESIN BACKED FLOOR COVERING

This application is a continuation-in-part of our copending application Ser. No. 73,452, filed Sept. 18, 1970 and now abandoned.

This invention relates to a method of making a floor covering having a vinyl chloride resin backing, and also to the floor covering so produced.

Granular polyethylene has been used as a hot melt to lock carpet tufts. Ethylene-vinyl acetate copolymer compounded with waxes and oils has been used as a hot melt to lock carpet tufts. Neither have been suggested or utilized to provide a heavy coating or foamed carpet backing.

Vinyl plastisols have been utilized to lock carpet tufts and as heavy solid backings. Vinyl plastisol foams, mechanically frothed and/or chemically expanded, have been used to provide resilient carpet backing. However, it has been desired to avoid the expense attendant upon using large quantities of plastisol grade vinyl resin.

The invention contemplates the in situ formation of a vinyl chloride resin backing on a floor covering, by applying to the back of the floor covering discrete fragments (i.e., granules, which may be in the form of dice) of prefluxed plasticized vinyl chloride resin, followed by application of heat to melt the resin and thus form a continuous sheet.

In the accompanying drawings:

FIG. 1 is a purely diagrammatic elevational view representing an arrangement of apparatus suitable for carrying out one embodiment of the method of the invention;

FIGS. 2, 3 and 4 are fragmentary sectional elevational views on a larger scale taken along lines 2—2, 3—3 and 4—4, respectively, of FIG. 1;

FIG. 15 is a fragmentary sectional elevational view of still another modification of the invention.

Figure 1:
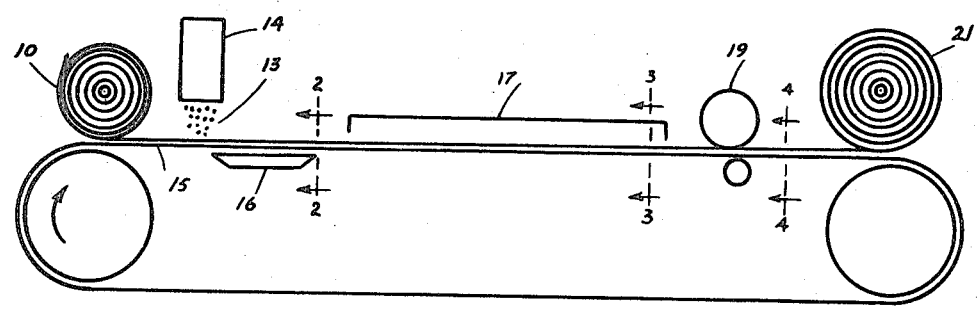

Solid and cellular vinyl backing for floor covering is in its infancy and all known commercially produced yardage has been coated using liquid vinyl plastisols. We have found granulated or fragmented prefluxed vinyl chloride resin compounds to be most effective in locking carpet tufts and for the production of solid and foamed backing for floor covering. A pepper and salt or multi-colored tweed-like pattern with built in colors is possible by blending differently colored granules.

Utilization of plasticized prefluxed vinyl chloride resin granules differs from the use of granular polyethylene in that with the vinyl chloride resin we can melt the particles to lock the tufts and concurrently apply a heavy gauge solid or cellular flexible backing thereby producing a stronger product. Granular polyethylene will melt to lock the tufts but if we attempted to apply a heavy gauge backing, the resultant product would be extremely stiff and boardy.

Compounded ethylene-vinyl acetate copolymer (EVA) has been used as a hot melt to lock the carpet tufts and adhere a secondary backing. It is neither used nor suggested as a flexible backing, solid or cellular, in the manner in which we use prefluxed vinyl chloride resin here. The EVA is a homogeneous molten liquid at the time of application.

Vinyl plastisols are liquids at room temperature and are applied to carpet as such. Subsequent to application they must be heated to fusion temperature, thereby converting to a solid vinyl. If they are mechanically frothed prior to fusion, the resultant backing will be an open interconnecting vinyl foam (or sponge). If they are formulated using a chemical blowing agent, they produce a closed cell foam during the fusion process. Whether the vinyl carpet backing from plastisol be solid or foamed, it will be homogeneous in color. Vinyl chloride resin granules are discrete homogeneous solid particles having had a prior heat history. The vinyl resins used in preparation of the particles cost about one-half as much as those used in plastisols. The prefluxed granules may be compounded to provide any desired degree of softness or flexibility and when chemical blowing agents are incorporated in the compound, closed cell foams result. In addition to forming backing for flexible carpet, the prefluxed granules containing blowing agent can form foamed backing for other flooring materials including various floor tiles and hard floor coverings (e.g., vinyl, asphalt, linoleum, rubber, wood, ceramic). Granules of various colors may be blended prior to their application to the floor covering, thereby providing multi-colored backings.

The vinyl resins employed in the invention include particularly the vinyl chloride resins, whether polyvinyl chloride homopolymer itself, or a vinyl chloride copolymer containing more than 50 percent by weight of vinyl chloride, such as a vinyl chloride-vinyl acetate copolymer, or similar copolymer of vinyl chloride with a copolymerizable monoethylenically unsaturated monomer, such as ethylene, propylene, cetyl vinyl ether, dialkyl maleate esters, acrylonitrile, styrene, etc. The resin is employed in plasticized form, usually containing from about 30 to about 130 parts of one or more plasticizers per 100 parts by weight of resin, thereby providing a flexible backing for the carpet. Usually the vinyl resin employed has an inherent viscosity of from 0.5 to 1.5 (all inherent viscosities stated herein are measured by ASTM-D-1243-66 method); preferably 0.53 to 0.95, and more preferably 0.53 to 0.75. Compounds based on such resins have melting temperatures that do not come critically close to those of thermoplastic fibers which may be in the carpeting (e.g., polypropylene, acrylic fibers, etc.) The fragments (e.g., granules, dice, or the like) of prefluxed compounded vinyl resin employed in the invention ordinarily have a size within the range of from about 0.001 cubic inch to about 0.375 cubic inch, as distinguished from a fine powder. "Pre-fluxed" means that the resin-plasticizer mixture has been heated to fusion (melting) temperature to flux the resin and plasticizer into a single, homogeneous, continuous phase, after which the composition is cooled and broken up into the desired fragments, whether rather irregular shaped fragments such as rough granules, or more regularly shaped granules such as "dice" (i.e., more or less square shaped pieces punched or cut from a flat sheet of the compound). An important advantage of employing prefluxed vinyl chloride resin compound in the method of the invention is the relative ease of forming a coherent, strong, homogeneous plastic sheet by in situ melting of prefluxed compound, as contrasted to resin powder which has not previously been prefluxed.

The vinyl compound may include any additional appropriate conventional compounding ingredients such as stabilizers, fillers or pigments as desired, etc. In making resilient blown carpet backing any suitable conventional blowing agent may be employed, such as, for example, those disclosed in U. S. Pat. Nos. 3,432,452, Hersh et al., Mar. 11, 1969 and 3,433,700, Migdol et al., Mar. 18, 1969. It will be understood that the blowing agent is mixed in with the resin and other ingredients prior to the prefluxing, and that the condition of prefluxing are such that the blowing agent does not decompose, but under the influence of the heat applied during the in situ melting of the resin compound on the carpeting, the blowing agent decomposes, liberating gas which causes the melt to blow or expand to a cellular condition.

The carpeting on which the compounded vinyl chloride resin is applied as a backing in accordance with the invention may be of any suitable desired type or construction, whether woven or non-woven, for example having piles in uncut ("loops") or cut ("tufts") form, assembled in any conventional manner as by weaving, needle punching, etc. In usual carpet constructions, piles, loops or tufts of yarn or the like extend into a woven or non-woven fabric which serves as a base for the yarns. The invention provides a strong anchorage for the bases of such yarns, by reason of the manner in which the in situ melted resin flows into or penetrates the fabric, surrounding and embedding the bases of the yarns so that they will not readily pull out of the carpeting. The carpeting may be based on any suitable conventional natural or synthetic fiber-like substance or combination thereof, including cotton, rayon, wool, nylon, polyester, acrylic, polypropylene, glass, etc., frequently in the form of piles (loops or tufts) of yarn or filaments which are inserted into or through a base material which receives the tufts or piles, such as a woven or non-woven fabric base made of jute or any of the previously mentioned fibers.

The prefluxed resin fragments (granules) are appropriately spread or dropped on the back side of the carpeting while the carpeting is in an inverted position, and distributed evenly and leveled with the aid of conventional apparatus such as a spreader bar and/or a vibrator. The latter has the advantage of encouraging the smaller size fragments of resin compound to migrate to the bottom thus providing more points of contact with the carpet fibers for better adhesion upon melting.

The resulting interlocking of the resin backing to the fibers produces adhesion values in excess of the minimum 6 pound pull usually required, as measured by ASTM-D-1335-67, and in fact values in excess of 12 pounds, which are considered excellent, are readily attained by the invention.

An important feature of the invention resides in the fact that heavy, relatively thick but still flexible backings can be formed, of the order for example of 1/32 to ½ inch. This is in contrast to molten polyethylene or compounded ethylene-vinyl acetate copolymer backings which would make the carpet undesirably rigid and inflexible even if they could be applied in such thicknesses.

The prefluxed compounded vinyl chloride resin granules may be applied to the carpeting in more than one stage if desired, or may be combined with applications of resin in other forms such as plastisol or latex or dry mix blends. Plural applications of resin granules are particularly appropriate when it is desired to produce foamed backing, in which case a first application of granules devoid of blowing agent may be made to anchor the yarns of the carpeting firmly, followed by an application of granules containing blowing agent to form the resilient foam layer in situ on top of the solid anchoring layer. It is desired to mention that such plural application (first layer of unblown resin, second layer of blown resin) obviates difficulties that would be encountered in attempting to make a first layer of blown vinyl resin because the foamed material would provide too much of an insulating layer to successfully melt the "lower" portions of the resin, which in fact would be the portion that should also provide a binder for the tufts.

In accordance with another modification of the invention, a plastisol may first be applied to the back of the carpeting to serve as an anchoring or adhesive layer, followed by application of prefluxed granules containing blowing agent to form the relatively thick resilient foamed layer. Practice of the invention is remarkably economical compared to the cost of building up the entire backing to the desired thickness by use of plastisol, because plastisol grade resin is expensive in comparison to the present less costly granules. Plastisol resin is made by relatively expensive emulsion polymerization methods, whereas the non-plastisol grade resin used for making granules or dice is produced by lower cost polymerization and finishing processes involving suspension or bulk polymerization processes.

Still another modification of the invention involves first applying a latex precoat to the back of the carpeting to serve as an anchoring or adhesive layer instead of a plastisol precoat. The latex may be any polymer latex such as a latex of carboxylated or non-carboxylated SBR, butadiene-acrylonitrile copolymer, natural rubber, polyvinyl chloride or copolymers of vinyl chloride with copolymerizable comonomers such as methyl acrylate, ethyl acrylate, butyl acrylate, acrylic acids, vinyl acetate, dibutyl maleate, etc. When polyvinyl chloride latex is used, it usually contains an emulsifiable plasticizer to aid in film formation. After drying the latex precoat or anchoring coat, prefluxed vinyl resin granules are applied as previously described. When prefluxed granules are applied over an SBR precoating, the granules preferably contain a non-migratory type of plasticizer (e.g., a conventional polymeric type) to forestall penetration and weakening of the precoat by the plasticizer.

In another modification of the invention, the solid anchoring sheet made by in situ melting of prefluxed granules on the back of the carpeting may have superimposed thereon a foamed layer made from a "dry blend" powder containing blowing agent. Such dry blend may comprise the vinyl resin in the form of a powder that has not been prefluxed, plasticizer, stabilizer, blowing agent, filler if desired, or other desired ingredients. A relatively homogeneous mixture is achieved by blending these ingredients in a ribbon blender. Henschel mixer, or other blender intended for mixer powders, without fusion or fluxing. The resultant dry blend compound is dry to the touch (not wet or sticky) and is a relatively free flowing powder. This powder is distributed on the previously in situ formed solid vinyl anchoring sheet. It is preferably compacted or pressed into good contact with the aid of a roller, which may also serve to impress a back pattern if so desired. Upon heating of the dry mix layer to fusion temperature an adherent blown sheet is formed in situ, providing resilient qualities to the backing. Application of dry mix over a previously applied layer of fused granules in this manner is advantageous, in comparison to attempting to build up the entire carpet backing of dry blend, which would require more heat and/or more time to melt or flux into a continuous layer and might result in damage to heat-sensitive fiber constructions. When applying dry blend foam compound on top of the melted prefluxed granules (which lock the tufts) it is not required to expose heat sensitive fibers to as much direct heat when fluxing and foaming the dry blend.

The invention thus provides a method of making a carpet or the like which is tough, flame resistant, has low water absorption, is launderable, and reversible.

The invention is also applicable to hard surface floor coverings. In this form of the invention the foamable vinyl granules are deposited on the back of a hard floor covering, giving it increased softness. This form of the invention is applicable to any hard floor covering (vinyl, asphalt, linoleum, rubber, wood, ceramic, etc.). The thickness of the integral foam underlay thus formed may vary, for example, from 0.025 to 0.5 inch. Optionally, an adhesive, such as a suitable latex compound or plastisol, may be applied to the back of the hard floor covering before depositing the prefluxed granular vinyl layer of the invention. The granules may be of one color, or multi-colors to provide a tweed-like pattern. The final product offers a comfortable softness and resilience under foot similar to soft surface floor covering (carpet). Its irregular back surface permits ease of removal of the product after having been installed with adhesive, whereas a smooth backed product with more adhesive contact would be difficult to remove.

The following examples will serve to illustrate the practice of the invention in more detail.

EXAMPLE I

This example illustrates the manufacture of a tufted carpet with a solid vinyl chloride resin backing formed by hot melting in situ. The formulation used is based on a polyvinyl chloride resin having an inherent viscosity of 0.75 commercially available as "Marvinol 24". The formulation includes dioctyl phthalate ("DOP") as a plasticizer, epoxidized soybean oil having an oxirane oxygen content of about 6.5–7.7 percent ("G-62") to aid stabilization, and a conventional dibasic lead phthalate ("Dythal") stabilizer. The formulation is as follows:

| Formulation of Granules for Hot Melt Solid Vinyl Backing | |
|---|---|
| Ingredients | Parts by Weight |
| Marvinol 24 | 100 |
| DOP | 95 |
| G-62 | 5 |
| Dythal | 3 |

Figures 2, 3, 4:
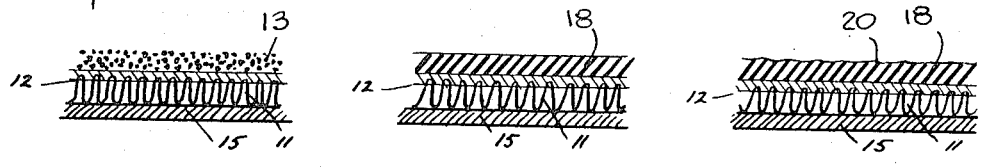

A vinyl chloride copolymer resin, such as a copolymer of 90 percent vinyl chloride and 10 percent vinyl acetate, may be substituted for the polyvinyl chloride. The materials are fluxed on a two-roll mill heated to a temperature of 240°–250°F. to form sheets. The sheets are cooled and granulated to a size which passes a 10 mesh grid or screen (maximum dimension 0.0787 inch; U.S. Bureau of Standards standard screen series). As shown in FIG. 1 of the drawings, a roll 10 of tufted carpeting is provided having tufts or loops 11 (FIG. 2) of yarn (e.g., nylon) extending through a base fabric 12 (made for example of woven jute). The prefluxed compounded resin granules 13 are fed from a hopper 14 (FIG. 1) onto the back side of the carpeting as the carpeting is advanced under the hopper in an upside down position on an endless moving conveyor belt 15. A vibrator plate 16 may be used to distribute evenly and level the granules on the back of the carpeting. In this example the amount of compounded resin applied may amount to about 60 ounces per square yard. The carpeting advances on the conveyor into a forced draft oven 17, heated to a temperature of 400°F. The dwell time in the oven is 8 minutes. The resin compound melts to form a continuous sheet 18 (FIG. 3) about ⅛ inch thick. The vinyl compound 18 penetrates the carpet base fabric 12 and surrounds and embeds the bases of the tufts 11 where they extend into the base fabric, thus locking the bottoms of the tufts firmly to the base fabric. The tuft lock adhesion is greater than 12 pounds (measured in accordance with ASTM-D-1335-67). The assembly after emerging from the oven 17 may pass under a water cooled embossing roll 19 which impresses a pattern 20 (FIG. 4) on the vinyl backing. The final product may be taken up into a roll 21.

EXAMPLE II

Example I is repeated using, in place of Marvinol 24, a lower melt viscosity polyvinyl chloride resin having an inherent viscosity of 0.53, commercially available as "Marvinol 26".

The formulation is as follows:

| formulation of Granules for Hot Melt Solid Vinyl Backing | |
|---|---|
| Ingredients | Parts by Weight |
| Marvinol 26 | 100 |
| DOP | 95 |
| G-62 | 5 |
| Dythal | 3 |

The formulation is prefluxed and formed into granules as in Example I. Following the procedure of Example I, the prefluxed compounded resin granules are applied to the back of the carpeting at the rate of 33 ounces per square yard, to produce a vinyl resin backing about 1/32 inch thick. The tuft lock adhesion is greater than 12 pounds. The resin penetrates further into the carpet fibers than in Example I. The lower melt viscosity resin is also useful for saving on heater (oven) costs or for achieving greater production rates since it has a lower melting temperature.

EXAMPLE III

This example illustrates the use of granules containing blowing agents, to produce hot melt foamed vinyl carpet backings. The blowing agents employed are azodicarbonamide ("Celogen AZ") and p,p'-oxybis(benzene sulfonyl hydrazide) ("Celogen OT"). The formulations are as follows:

| Formulations of Granules for Foamed Vinyl Backing | | | | |
|---|---|---|---|---|
| Materials | | Parts by Weight | | |
| | III-A | III-B | III-C | III-D |
| Marvinol 24 | 100 | — | — | — |
| Marvinol 26 | — | 100 | 100 | 100 |

-Continued

Formulations of Granules for Foamed Vinyl Backing

| Materials | Parts by Weight | | | |
|---|---|---|---|---|
| | III-A | III-B | III-C | III-D |
| DOP | 75 | 75 | 95 | 95 |
| G-62 | 5 | 5 | 5 | 5 |
| Dythal | 3 | 3 | 3 | 3 |
| Celogen AZ | 5 | 5 | 5 | — |
| Celogen OT | — | — | — | 10 |

The compounds containing blowing agents are fluxed, sheeted and granulated as in Example I, the processing temperature being kept below that at which the blowing agent would decompose (below about 280°F in the case of Celogen AZ and below about 260°F in the case of Celogen OT).

Figure 5:
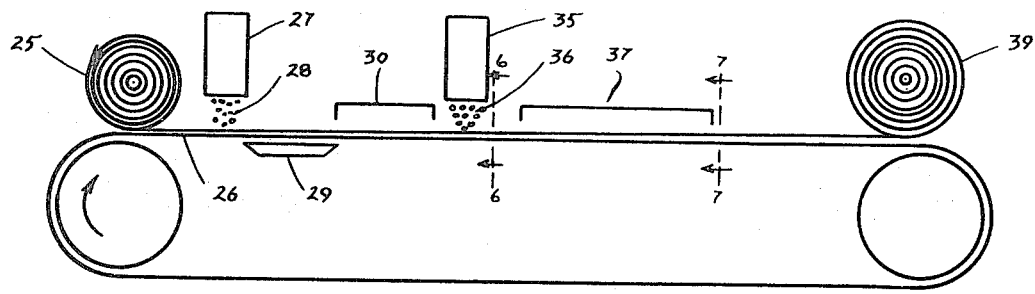
FIGS. 5, 8 and 12 are views similar to FIG. 1, representing modifications of the invention.
Figures 6, 7:
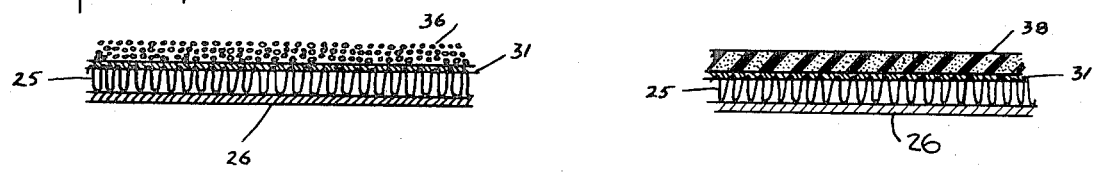
FIGS. 6, 7, 9–11, 13 and 14 are associated fragmentary sectional views.
Figure 8:
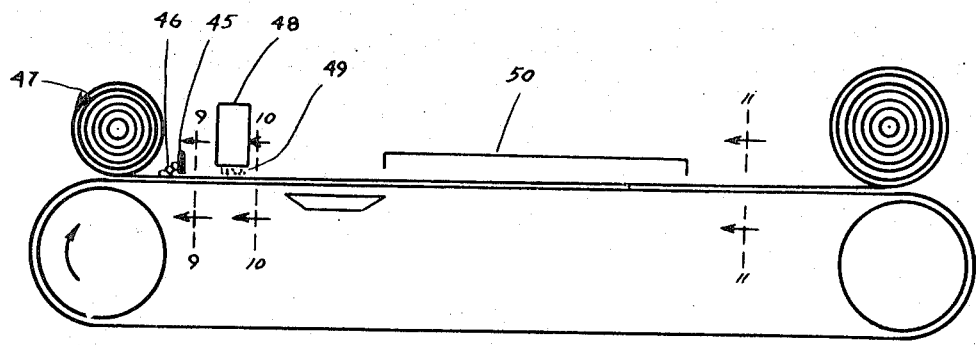
Figures 9, 10, 11:
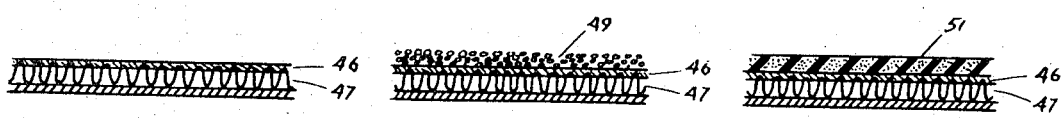

Prior to forming the foamed backing, the tufts are first locked in place with a hot melt solid vinyl layer, on which the foam is subsequently formed. Referring to FIG. 5, tufted carpeting is fed from a supply roll 25 onto a conveyor belt 26 in an inverted position and passes beneath a hopper 27 which deposits prefluxed granules 28, having the formulation described in Example II, onto the back of the carpeting, at a rate of about 30–40 ounces per square yard. A vibrator 29 distributes the granules evenly, which are then melted in an oven 30 as in Example I to form a solid film 31 (FIG. 6) which locks the tufts of the carpeting in place. The assembly then passes beneath a second hopper 35 which serves to deposit prefluxed granules 36 containing blowing agent, having formulation III-A, at a rate of about 35 ounces per square yard, onto the still hot surface of the solid film 31, and the assembly is passed through an oven 37 heated to a temperature of 360°F; the assembly takes 10 minutes to pass through the oven. This melts the resin granules 36 and causes the blowing agent to decompose, forming a foam backing 38 (FIG. 7) welded to the solid resin film 31. The product may be wound up in a roll 39 (FIG. 5). This example may be repeated, using resin granules of formulation III-D to form the foam layer, in an oven heated to 300°F. Again an excellent foam backed product results. Formulations III-B and III-C permit shorter heating times than formulation III-A.

Example IV

In this example of a procedure for making tufted carpet with a hot melt blown vinyl compound backing, a vinyl plastisol is applied prior to application of the prefluxed resin granules containing blowing agent. The plastisol formulation may be based on vinyl chloride-vinyl acetate copolymer plastisol resin containing about 94 percent vinyl chloride and about 6 percent vinyl acetate, as follows:

Plastisol Formulation

| Materials | Parts by Weight |
|---|---|
| Vinyl chloride-vinyl acetate copolymer | 100 |
| Di(2-ethylhexyl)phthalate | 100 |
| Epoxidized soybean oil oxirane oxygen content 6.5–7.7% | 5 |
| Barium, cadmium, zinc phosphite stabilizer | 3 |
| Calcium carbonate filler | 100 |

The plastisol is spread on the back of the carpeting at the rate of 16 ounces per square yard, with the aid of a spreading bar. Prefluxed granules containing blowing agent (e.g., formulation III-D) are then applied to the wet plastisol coating followed by heating in the oven at about 360°F. The heating serves to fuse the plastisol into a solid film, locking the tufts in place; the molten granules fuse to the plastisol layer and expand to a foamed condition, producing a final product analogous to that resulting from Example III, except that in this case the film of resin which locks the tufts and carries the foam backing is derived from the plastisol rather than from hot melt prefluxed resin granules as was the case in Example III. Referring to FIGS. 8–11, suitable apparatus for carrying out this example includes a doctor blade 45 for spreading the plastisol 46 into a thin film on the back of the carpeting 47, and a hopper 48 for applying the prefluxed granules 49 onto the wet plastisol. After passing through the oven 50 to fuse the plastisol and melt and expand the vinyl granules, the product has a foamed backing 51 (FIG. 11) with the tufts locked in place by the fused plastisol layer 46.

EXAMPLE V

In this example, hot melt prefluxed compounded resin granules are used to lock the tufts, while the foam backing is formed from a dry blend (not prefluxed) rather than prefluxed granules as in previous examples. A suitable dry blend formulation is as follows:

Dry Blend Foam Formulation

| Ingredients | Parts by Weight |
|---|---|
| Marvinol 26 | 100 |
| Di(2-ethylhexyl)phthalate | 60 |
| G-62 | 6 |
| Barium, cadmium, zinc phosphite | 2 |
| Calcium carbonate | 10 |
| Stearic acid | 0.4 |
| Celogen AZ | 4 |

The dry blend ingredients are mixed in a ribbon blender, forming a relatively free flowing powder.

Figure 12:
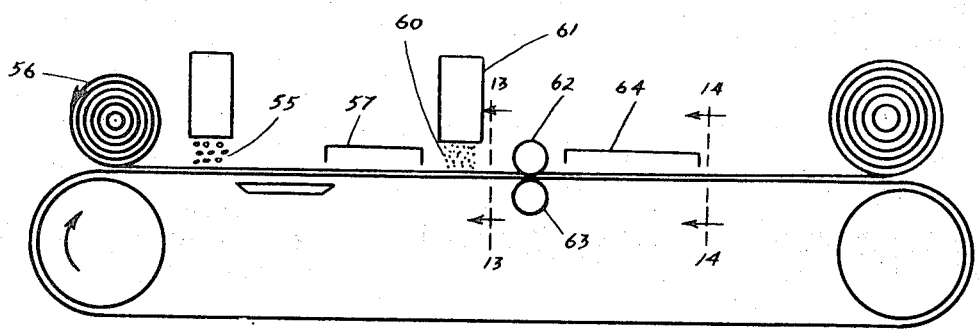
Figures 13, 14:
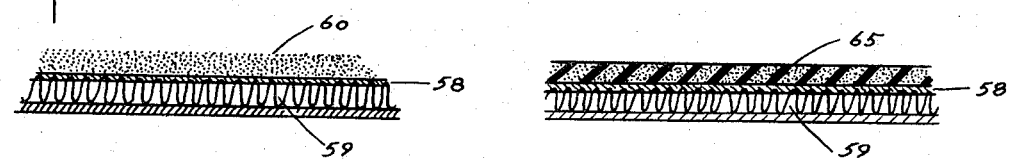
Figure 1S:
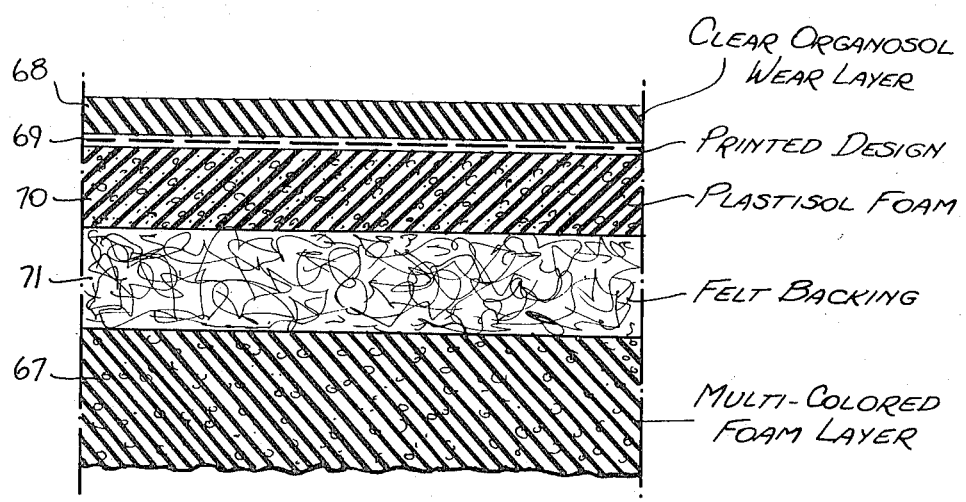

Referring to FIGS. 12–14, prefluxed compounded vinyl granules 55, formulated as in Example 1, are applied to the carpeting 56 at the rate of 30 ounces per square yard and melted in a first oven 57 (temperature 360°F, time 10 minutes) to form a film 58 which locks the tufts 59 in place. The above preblend powder (not fluxed) 60 is metered from a hopper 61 onto the still hot resin film 58 at the rate of 30 ounces per square yard. The powder layer is compacted and pressurized against the assembly between two rollers 62, 63 and then the assembly passes through a second oven (temperature 400°F; time 10 minutes) 64 to fuse and foam the dry blend, forming an expanded foam backing 65 on the carpet.

EXAMPLE VI

The procedure of Example IV is modified by substituting, for the plastisol, a latex formulation as follows:

Latex Precoat Formulation

| Materials | Parts by Weight | |
|---|---|---|
| | Dry | Wet |
| Carboxylated rubber latex | 100 | 208 |
| Surface active agent | 1 | 4 |
| Tetrapotassium pyrophosphate | 0.5 | 2 |
| Antioxidant | 0.6 | 1 |
| Antifoam agent | 0.1 | 0.5 |

-Continued

| Materials | Latex Precoat Formulation Parts by Weight | |
| --- | --- | --- |
| | Dry | Wet |
| Water | 0 | 20 |
| Filler | 250 | 250 |
| Thickener | 0.75 | 6 |

The latex may be a 48% solids latex of butadiene:acrylonitrile:itaconic acid terpolymer (64:32:4). The surface active agent may be sodium dinaphthyl methane disulfonate or equivalent as represented by such commercially available products as "Tamol SN". The antioxidant may be 2,2'-methylenebis(4-methyl-6-nonyl phenol). The antifoam agent may be a dimethylpolysiloxane oil, specific gravity 0.99–1.01 or equivalent as represented by such commercially available materials as Dow Corning Antifoam C. The filter may be calcium carbonate. The thickener may be sodium polyacrylate, molecular weight 300,000. The formulation is spread, at the rate of 20 ounces (dry) per square yard, on the back of tufted nylon carpet for the purpose of locking the tufts and penetrating the fiber bundles. This precoating is then dried by placing the coated carpet in an oven heated at a temperature of 250°F. for 20 minutes. A blend of 10 percent by weight of prefluxed vinyl granules of formulation III-A (Example III) and 90 percent by weight of prefluxed granules of the same formulation but modified by addition of phthalocyanine blue pigment (1 part per 100 parts by weight of vinyl resin) is next applied to the back of the carpeting at the rate of 24 ounces per square yard on top of the dried latex coating. The construction is placed in an oven for 7 minutes at 330°F. When removed from the oven a multicolored vinyl foam backed carpet with tuftlock and bundle penetration is obtained, with the expanded resin granules firmly adhered to the assembly through the medium of the latex precoat deposit.

EXAMPLE VII

This example, which is intended to be read with reference to FIG. 15 of the drawings, illustrates the formation of a foamed vinyl resin backing 67 on a hard surface floor covering. There is first provided a conventional hard surfaced floor covering consisting of a transparent vinyl wear layer 68 (for soil and abrasion resistance; formed for example from an organosol), an underlying printed design 69, a vinyl foam layer 70 (formed for example from an expandable plastisol), and a felt backing 71. The wear layer 68 may be, for example about 0.008 inch thick, the plastisol foam layer 70 for example about 0.027 inch thick, and the felt backing 71 for example about 0.030 inch thick. According to the invention such a conventional structure is improved by spreading on the back of the felt (the assembly of course being in an upside down position) the prefluxed vinyl granules (blended in two colors as described in Example VI), at the rate of 24 ounces per square yard. The assembly is placed in an oven at 330°F. for 6 minutes, to produce a multicolored vinyl foam backed hard surface flooring with an uneven back surface as illustrated in FIG. 15. The foam 67 produced by the expanded granules is about 0.25 inch thick.

Having thus described our invention, what we claim and desire to protect by Letters Patent is:

1. A method of making a pile carpet comprising in combination the steps of:
   a. providing a layer of pile carpet fabric;
   b. applying a plastisol to the back side of said pile carpet fabric, the plastisol flowing around and embedding the bases of the piles;
   c. applying over said plastisol a layer of prefluxed vinyl chloride resin granules containing a blowing agent, the said vinyl chloride resin being selected from the group consisting of polyvinyl chloride and copolymers containing more than 50 percent by weight of vinyl chloride copolymerized with a copolymerizable monoethylenically unsaturated monomer; and
   d. thereafter heating the resulting assembly to fuse the said plastisol to a solid state and to melt the said granules and decompose the blowing agent, whereby a layer of blown vinyl foam is formed on the back of the fabric, the fused plastisol serving to lock the bases of the piles in place and serving to adhere the foamed layer to the fabric.

2. A method as in claim 1 in which the said granules are of more than one color to provide a multicolored effect.

3. A method of making a pile carpet comprising in combination the steps of:
   a. providing a layer of pile carpet fabric;
   b. applying a latex to the back side of said pile carpet fabric, the latex flowing around and embedding the bases of the piles;
   c. drying the said latex to provide a polymeric deposit which locks the bases of the piles in place;
   d. applying over the said dried polymeric deposit a layer of prefluxed vinyl chloride resin granules containing a blowing agent, the said vinyl chloride resin being selected from the group consisting of polyvinyl chloride and copolymers containing more than 50 percent by weight of vinyl chloride copolymerized with a copolymerizable monoethylenically unsaturated monomer; and
   e. thereafter heating the resulting assembly to melt the said granules and decompose the blowing agent whereby a layer of blown vinyl foam is formed on the back of the fabric, the latex deposit serving to adhere the foam layer to the back of the fabric.

4. A method as in claim 3 in which the said granules are of more than one color to provide a multicolored effect.

5. A method of making a hard surfaced floor covering having a resilient backing comprising in combination the steps of:
   a. providing a hard surfaced floor covering having, in sequence, a transparent vinyl organosol wear layer, an underlying printed design, a vinyl foam layer, and a felt backing;
   b. spreading, on the back of said felt backing, a layer of prefluxed vinyl chloride resin granules containing a blowing agent, the said vinyl chloride resin being selected from the group consisting of polyvinyl chloride and copolymers containing more than 50% by weight of vinyl chloride copolymerized with a copolymerizable monoethylenically unsaturated monomer; and
   c. thereafter heating the resulting assembly to melt the said granules and decompose the blowing agent whereby a layer of blown vinyl foam is formed on the back of the felt providing an uneven back surface which permits easy removal of the flooring after it has been installed with an adhesive.

6. A method as in claim 5 in which the said granules are of more than one color to provide a multicolored effect.

* * * * *